US009182946B2

(12) United States Patent
Sellers

(10) Patent No.: US 9,182,946 B2
(45) Date of Patent: Nov. 10, 2015

(54) METHOD OF GENERATING A COMPUTER ARCHITECTURE REPRESENTATION IN A REUSABLE SYNTAX AND GRAMMAR

(71) Applicant: Russell Sellers, Austin, TX (US)

(72) Inventor: Russell Sellers, Austin, TX (US)

( * ) Notice: Subject to any disclaimer, the term of this patent is extended or adjusted under 35 U.S.C. 154(b) by 0 days.

(21) Appl. No.: 14/206,313

(22) Filed: Mar. 12, 2014

(65) Prior Publication Data

US 2014/0282363 A1    Sep. 18, 2014

Related U.S. Application Data

(60) Provisional application No. 61/800,272, filed on Mar. 15, 2013, provisional application No. 61/800,387, filed on Mar. 15, 2013.

(51) Int. Cl.
| | |
|---|---|
| *H04L 12/42* | (2006.01) |
| *G06F 19/00* | (2011.01) |
| *G06F 17/50* | (2006.01) |
| *G06F 15/16* | (2006.01) |
| *G06F 17/00* | (2006.01) |
| *G06F 17/25* | (2006.01) |
| *G06F 11/22* | (2006.01) |
| *G06F 9/44* | (2006.01) |
| *G06F 9/45* | (2006.01) |
| *G06F 9/445* | (2006.01) |
| *G06F 7/04* | (2006.01) |
| *G06F 17/30* | (2006.01) |
| *G06Q 10/00* | (2012.01) |

(52) U.S. Cl.
CPC .. *G06F 8/20* (2013.01); *G06F 8/31* (2013.01); *G06F 8/41* (2013.01); *G06Q 10/00* (2013.01)

(58) Field of Classification Search
CPC ............ G06F 17/5068; G06F 17/5072; G06F 17/5077; G06F 17/30569; G06F 11/1433; G06F 11/2247; G06F 8/10; G06F 8/60; G06F 8/63; G06F 8/314; G06F 9/44505; G06F 21/6218; G06F 8/61; G06F 17/3089; G06F 11/263; G06F 17/5045; G06F 8/36; G06F 8/47; G06F 8/447; G06Q 10/087

See application file for complete search history.

(56) References Cited

U.S. PATENT DOCUMENTS

| | | | |
|---|---|---|---|
| 4,754,409 A | 6/1988 | Ashford et al. | |
| 5,701,400 A | 12/1997 | Amado | |
| 5,877,966 A * | 3/1999 | Morris et al. | 716/136 |
| 6,088,659 A * | 7/2000 | Kelley et al. | 709/203 |
| 6,199,068 B1 * | 3/2001 | Carpenter | 370/449 |
| 6,226,656 B1 | 5/2001 | Zawadzki et al. | |
| 6,247,128 B1 * | 6/2001 | Fisher et al. | 717/178 |

(Continued)

FOREIGN PATENT DOCUMENTS

DK    WO9948031 A1    9/1999

*Primary Examiner* — Don Wong
*Assistant Examiner* — Anibal Rivera
(74) *Attorney, Agent, or Firm* — Hulsey Hunt & Parks P.C.

(57) ABSTRACT

Techniques and a system for creating a vendor independent computer language and compiling the language into an architecture specification language allowing for taking a source data stream (file, wsdl, xml) and passing thru a language parser, populating a storage medium with a plurality of technical inputs and vendor technical specifications for generic technologies and probable technologies required for desired architectures generated by the language parser, and optimizing the inputs and creating relationships between technologies and groups of technologies and storing results in said storage medium.

19 Claims, 6 Drawing Sheets

(56) References Cited

U.S. PATENT DOCUMENTS

| | | | |
|---|---|---|---|
| 6,430,741 B1* | 8/2002 | Mattson et al. | 717/154 |
| 6,526,423 B2 | 2/2003 | Zawadzki et al. | |
| 6,651,062 B2 | 11/2003 | Ghannam et al. | |
| 7,031,907 B1* | 4/2006 | Passaretti et al. | 717/105 |
| 7,188,333 B1 | 3/2007 | LaMotta et al. | |
| 7,278,133 B2* | 10/2007 | Roman et al. | 717/120 |
| 7,376,939 B1* | 5/2008 | Nayak et al. | 717/144 |
| 7,587,379 B2 | 9/2009 | Huelsman et al. | |
| 7,596,518 B2* | 9/2009 | Rappaport et al. | 705/29 |
| 7,725,817 B2* | 5/2010 | Krasun et al. | 717/143 |
| 7,814,551 B2* | 10/2010 | Darweesh et al. | 726/26 |
| 7,818,729 B1* | 10/2010 | Plum et al. | 717/140 |
| 8,055,604 B2 | 11/2011 | Huelsman et al. | |
| 8,650,506 B2* | 2/2014 | Erickson et al. | 715/849 |
| 8,677,505 B2* | 3/2014 | Redlich et al. | 715/255 |
| 8,949,773 B2* | 2/2015 | Paradkar et al. | 717/104 |
| 2003/0055820 A1 | 3/2003 | Aigen | 707/4 |
| 2003/0149934 A1* | 8/2003 | Worden | 715/513 |
| 2003/0167444 A1* | 9/2003 | Zorc | 715/513 |
| 2003/0208743 A1* | 11/2003 | Chong et al. | 717/106 |
| 2004/0046789 A1* | 3/2004 | Inanoria | 345/748 |
| 2004/0068716 A1* | 4/2004 | Stevens | 717/140 |
| 2004/0158823 A1* | 8/2004 | Saint-Hilaire et al. | 717/140 |
| 2004/0168160 A1* | 8/2004 | Zatloukal | 717/140 |
| 2004/0181500 A1 | 9/2004 | Huelsman et al. | |
| 2004/0268327 A1* | 12/2004 | Burger | 717/140 |
| 2005/0004942 A1* | 1/2005 | Madsen et al. | 707/104.1 |
| 2005/0071825 A1* | 3/2005 | Nagaraj et al. | 717/142 |
| 2005/0080648 A1 | 4/2005 | Huelsman et al. | |
| 2005/0096937 A1* | 5/2005 | Subash et al. | 705/1 |
| 2005/0154550 A1* | 7/2005 | Singh et al. | 702/108 |
| 2005/0289485 A1* | 12/2005 | Willis | 716/1 |
| 2006/0004802 A1* | 1/2006 | Phillips et al. | 707/101 |
| 2006/0095274 A1* | 5/2006 | Phillips et al. | 705/1 |
| 2007/0050704 A1* | 3/2007 | Liu | 715/513 |
| 2007/0113221 A1* | 5/2007 | Liu et al. | 717/143 |
| 2008/0222734 A1* | 9/2008 | Redlich et al. | 726/26 |
| 2008/0250360 A1* | 10/2008 | Willis | 716/2 |
| 2008/0250390 A1* | 10/2008 | Feblowitz et al. | 717/114 |
| 2009/0048889 A1* | 2/2009 | Arinez et al. | 705/8 |
| 2011/0173596 A1* | 7/2011 | Vorbach | 717/146 |
| 2012/0060150 A1* | 3/2012 | Pechanec et al. | 717/140 |
| 2013/0080997 A1* | 3/2013 | Dattathreya | 717/121 |

* cited by examiner

METHOD OF GENERATING A COMPUTER ARCHITECTURE REPRESENTATION IN A REUSABLE SYNTAX AND GRAMMAR

CROSS-REFERENCE TO RELATED APPLICATIONS

This application claims priority to U.S. Provisional Patent Application Ser. No. 61/800,272, and U.S. Provisional Patent Application Ser. No. 61/800,387, both filed on Mar. 15, 2013, which are hereby incorporated by reference in its entirety. Other related applications having common inventorship and/or ownership as may mentioned throughout this disclosure, are also incorporated by reference in their entirety.

FIELD

The disclosed subject matter relates to methods of generating a computer architecture representation in a reusable syntax and grammar. As a result the invention also includes an enhanced means of creating artifacts such as high-level design documents, bills of materials and traditional drawings.

DESCRIPTION OF THE RELATED ART

The traditional method is for users to provide an engineer with goals, decisions and constraints and for the engineer to use vendor specification and his individual knowledge and experience to generate a high-level design. A user makes a business decision to deploy a particular application or technology. The user must make a series of business and technical decisions including if they will perform a completely new deployment and design or use an existing one. The requirements, decisions, and constraints are gathered, reviewed, accepted. The accepted requirements, decisions, and constraints are presented to an engineer who uses his knowledge and reference material to generate a high-level design. The problem that this creates is that high-level designs can be very specific to a customer and technology. If the end user decides to transition from one technology to another they have to have another design created potentially by a completely different engineer with the appropriate knowledge based on the desired technology. A significant amount of the information gathered and generated for the initial design is not retained and usable for subsequent designs.

SUMMARY

Techniques here disclosed include a method and system for generating a computer architecture representation in a reusable syntax and grammar. As a result the invention also includes an enhanced means of creating artifacts such as high-level design documents, bills of materials and traditional drawings.

The present invention provides a method of generating a computer architecture representation in a reusable syntax and grammar, wherein a plurality of language definitions that include at least a first language definition for technical specifications and attributes. This information is typically submitted by an engineer, and comes in the form of multiple specifications and may include vendor technical specifications, best practices, and corporate best practices. Technical Specifications for applications may include but are not limited to details such as: memory require, disk space required. Technical specifications for operating systems may include but are not limited to: hardware limitations such as required physical memory, processor type. Industry best practice details may include but are not limited to: that although the vendor recommends a certain amount of memory for an application, the industry best practice is 2 times that amount.

The term "technical specification" is understood herein as any data that is provided by an engineer or manufacturer, detailing technology including but not limited to operating system requirements, application requirements, or hardware requirements. As an exemplary scenario, a technical specification for Windows 2012 Server may specify minimum processor: 1.4 Ghz 64-bit processor, minimum ram: 512 MB, minimum disk: 32 GB.

In accordance with an embodiment of the invention the method provides a second language definition for business details and attributes. This information is typically provided by the user and includes but not limited to goals, decisions, constraints, site details and user details. A decision may include but are not limited to: a selection of a particular vendor. Business details may include but are not limited to: number of locations, size of locations, and users at locations.

The term "business details" and "business attributes" is understood herein as any data that is provided by a user that is specific to their business environment. As an exemplary scenario, a business attribute may specify to use the industry best practice over the vendor specification.

In accordance with a further embodiment of the invention the method provides a third language definition supplementary details and attributes. This information is custom data that can be customer or implementation dependent. An example supplemental detail may be able to be to a specific vendor or technology bias.

The term "supplementary details" and "supplementary attributes" is understood herein as any data that is provided by a user as custom data. As a exemplary scenario, a user may specify a operating system or manufacturer bias. such as Microsoft is a preferred vendor. Algorithms selected at runtime may use this supplemental data for decisions.

In an embodiment of the invention, the method provides for parsing and performing semantic grammar analysis for each of the language definitions that consist of reading each line of input, parsing and performing semantic grammar analysis of attributes of the specification, elements or lines, element lists/groups and attributes of the list/group, individual elements or lines and attributes of the elements, and finally individual lines or elements within a list/group and any attributes of that element and produce an intermediate representation as reusable individual elements and attributes. In Embodiments of the invention the method includes a means of deconstructing these specifications into re-usable elements, which provides the advantage that elements may be re-used in a plurality of designs.

In an embodiment of the invention, the method has a means for dynamically compile and generate an architectural specification based on user selected data, the produced intermediate representation, and an algorithm selected at run time that consists of reading each input variable and passing those variables to the specified algorithm. The algorithm processes the individual elements and attributes based on the defined algorithm. The output of the selected algorithm is then passed to the compiler to generate the architecture specification in a specific language definition.

The term "architecture representation" is understood herein as a data structure for storing and representing the data contained in a high-level deign in a generic reusable way.

In accordance with a further embodiment of the invention, the method has a means for dynamically compile and generate an architectural specification based on user selected data, the produced intermediate representation, supplemental details and attributes, and an algorithm selected at run time that consists of reading each input variable and passing those variables to the specified algorithm. The algorithm processes the individual elements and attributes based on the defined algorithm. The output of the selected algorithm is then passed to the compiler to generate the architecture specification in a specific language definition.

In accordance with a further embodiment of the invention, the method provides a means for dynamically generating industry standard technical documents from a generated architecture specification.

In another aspect the invention is directed to a system implementing the above described language specifications, methods and compiler mechanism.

Embodiments of the invention have the advantage that different architectures are capable of being generated rapidly based on a broader set of technical and engineering inputs than the conventional methods.

In accordance with an embodiment of the invention, the system further provides means for receiving a source data stream of input information from the user. Memory means allow for a data structure instantiating code segment that establishes a storage record in memory, as well as for storing technical input records, business input records, relationships, and architecture specification language representation. A processor means operates for parsing and performing semantic grammar analysis for each of the language definitions, as well as recording parsed results to the storage medium. The processor means further enables executing a selected optimization function to optimize and create relationships and saving the results to the storage medium. The disclosure includes executing a compilation function to compute and create an architectural representation in the specified syntax and grammar In accordance with a further embodiment of the invention, the system further provides means for receiving a source data stream of input information from the user. Memory means enable a data structure instantiating code segment that establishes a storage record in memory and for storing technical input records, business input records, relationships, supplemental details and attributes, and architecture specification language representation. A processor means operates parsing and performing semantic grammar analysis for each of the language definitions including supplemental details and attributes, recording parsed results to the storage medium, executing a selected optimization function to optimize and create relationships and save results to the storage medium, as well as executing a compilation function to compute and create an architectural representation in the specified syntax and grammar.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein:

In the following, embodiments of the invention are explained in greater detail by way of example only, making reference to the drawings which:

FIG. 1 provides a UML use case diagram being illustrative of an embodiment of a method of the invention.

DETAILED DESCRIPTION OF THE SPECIFIC EMBODIMENTS

Figure 1:
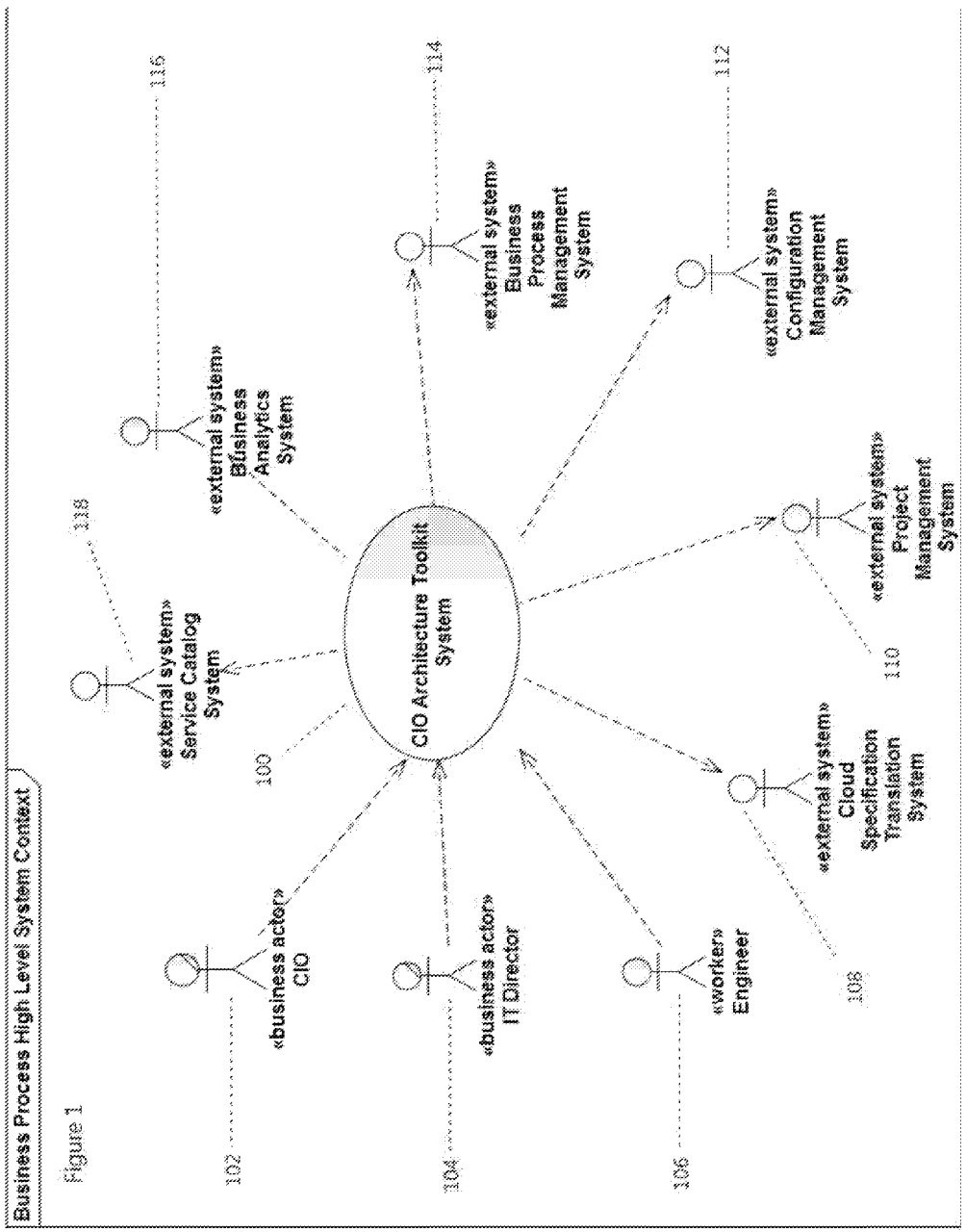

FIG. 1 is illustrative of an embodiment where an actor Element 106 and shows the information flow from the engineer into the method represented as Element 100. FIG. 1 also shows other actors that may interface with the method in a exemplary embodiment.

Figure 2:
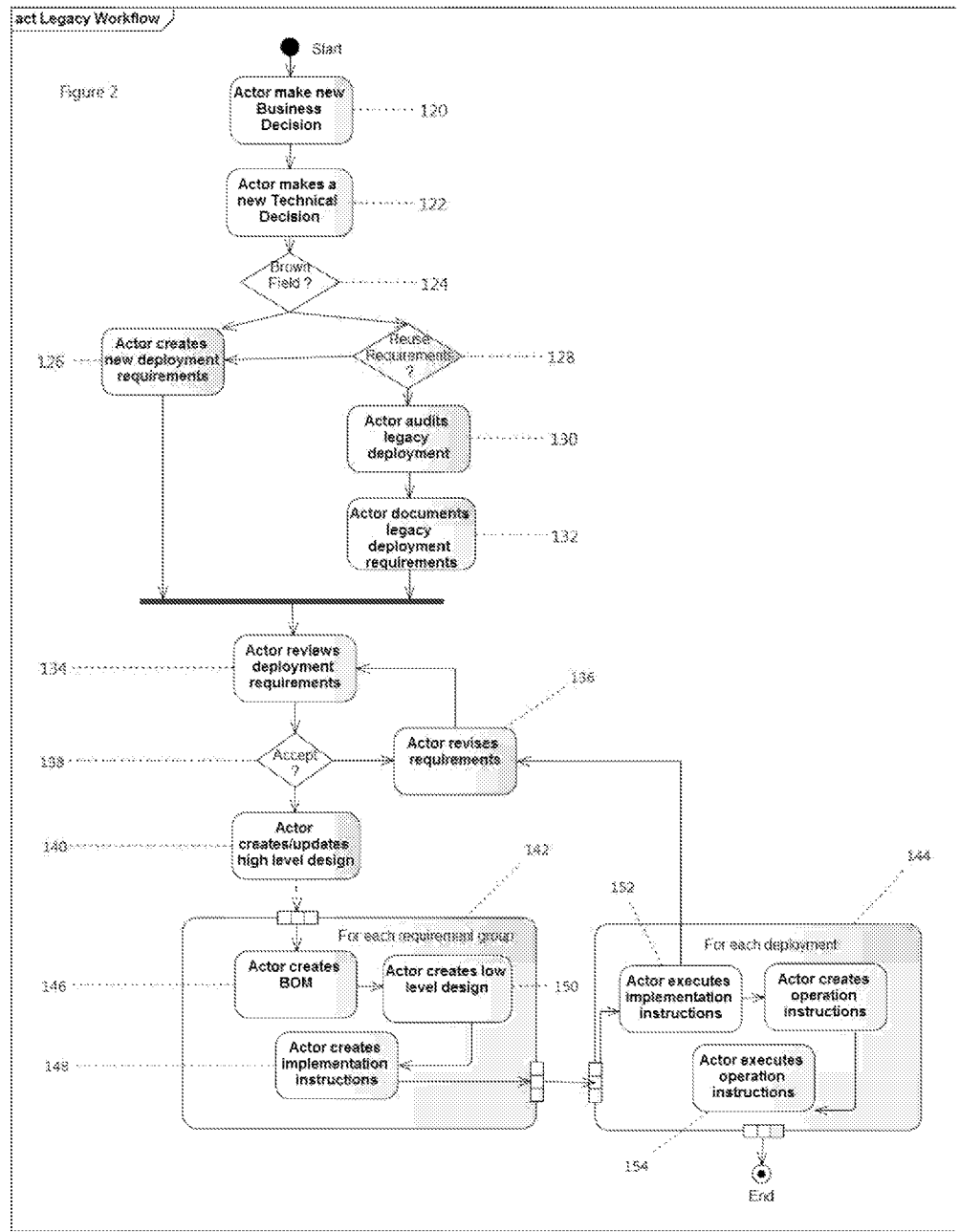
FIG. 2 is a UML activity diagram being illustrative of the conventional workflow for creating a high-level design.

FIG. 2, is illustrative of an embodiment where an actor 102, 104, or 106 from FIG. 1 makes a business decision to deploy a particular application or technology 120. An actor 102, 104 or 106 from FIG. 1, takes that business decision as input and make a series of technical decisions 122. The actor must make a decision 124 if the deployment is a new deployment or a deployment over an existing "Brown Field". If the deployment is a new deployment 126 then a new set of requirements are developed. If there is an existing deployment the actor must make a decision 128 to reuse existing requirements. If the actor chooses not to reuse existing requirements then the deployment is treated as a new deployment 126 and a new set of requirements are developed. If the actor chooses to reuse the existing requirements then an audit of the legacy deployment must be performed 130 and the requirements documented 132. The actor reviews the resulting requirements 134 for acceptance 138. If they do not meet the business decisions 120 and technical decisions 122 then they are not accepted 138 the requirements are revised 136. If the requirements are accepted 138, the actor generates by hand a high-level design document 140 based on his individual knowledge and experience. An actor then takes this high-level design, and for each requirement contained in the high-level design 142 he determines the necessary equipment, creates a Bill of Material 146, creates a low level design 150, and creates implementation instructions 148. To deploy the system, for each system to be deployed 144, the actor takes the implementation instructions 148 and executes them 152 to create the systems. He then creates operating instructions 156 for operating the systems and executes those 154 to place the system under operational management.

Figure 3:
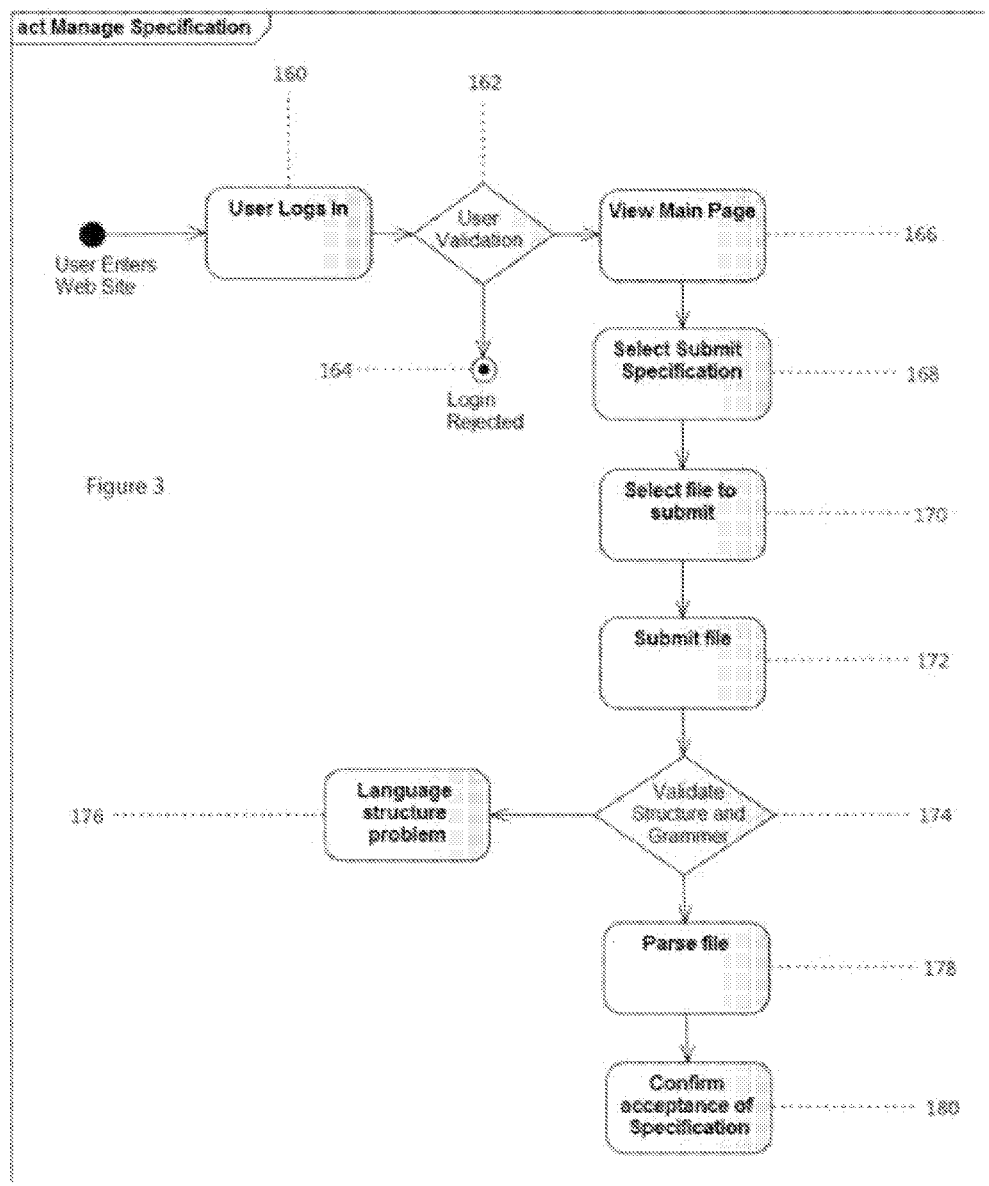
FIG. 3 is a UML activity diagram being illustrative of an embodiment of a method of submitting a specification for use as part of the body of reusable information.

FIG. 3 is illustrative of an embodiment where an actor submits a specification for use by the exemplary embodiment as part of the body of reusable information. Elements 160 thru 168 represent an interaction with the user interface of the system. An actor 106 from FIG. 1 attempts to access the system 160. If authentication 162 fails, the access is denied 164. If authentication 162 is successful, the main page 166 is displayed. The user selects select a specification file 168 and selects a specification file for use 170. The user then submits the file 172 for use. Lexical and syntactical analysis is performed on the submitted data to determine if the data is a valid structure and grammatical syntax 174. If the lexical or syntactical analysis fails there is a language or structure problem 176. If the lexical and syntactical analysis passes then the file is parsed 178 and the information retained for later use. A positive confirmation is provided of acceptance of the specification 180.

Figure 4:
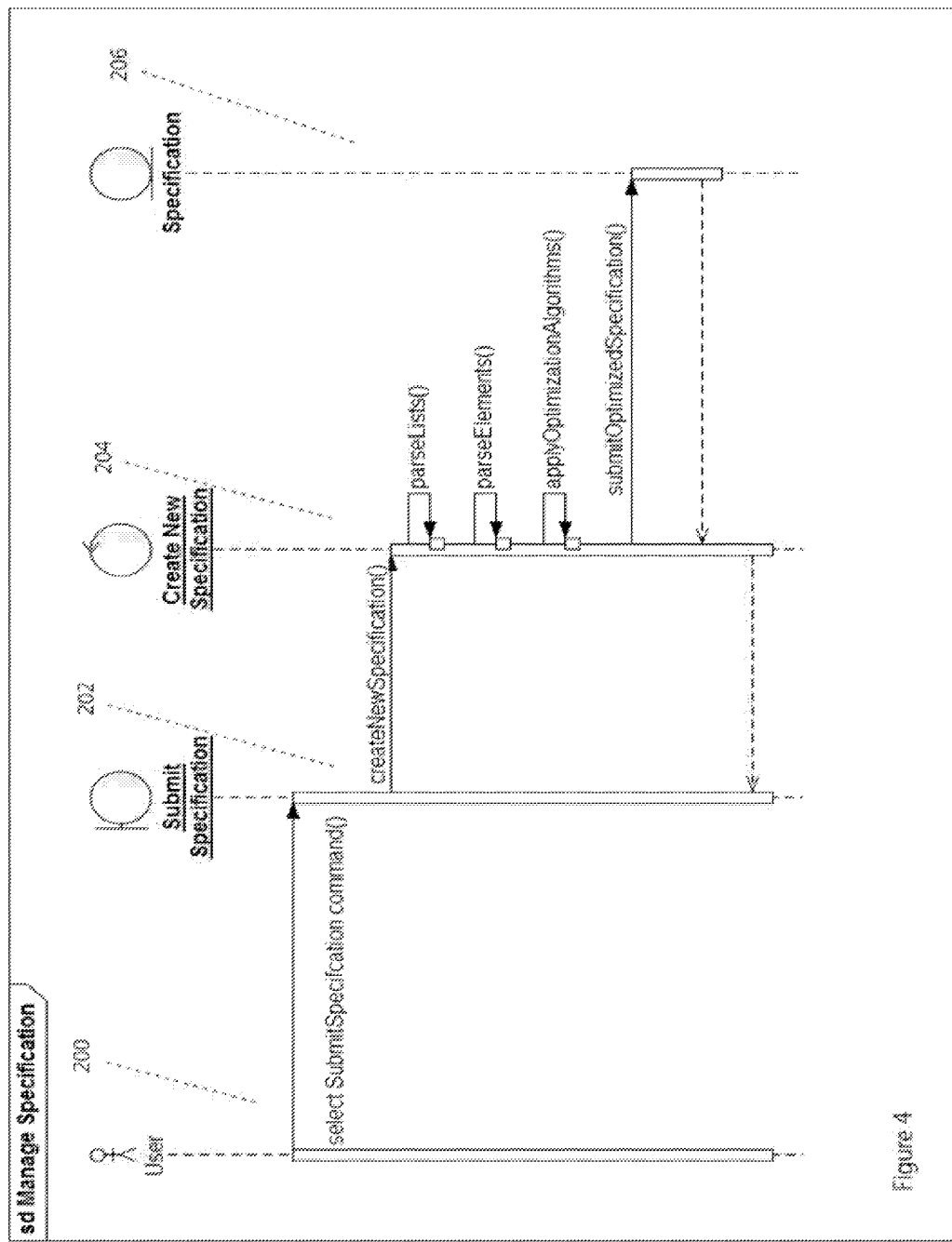
FIG. 4 is a UML sequence diagram being illustrative of an embodiment of a method of processing or deconstructing a specification.

FIG. 4 is illustrative of an embodiment where a user 200 interacts with the system via the Submit Specification boundary 202. The Create New Specification control 204 mediates between the Submit Specification boundary 202 and the Specification entity 206 and orchestrates the behavior including but not limited to the parsing of the lists, elements and execution of the algorithms.

Figure 5:
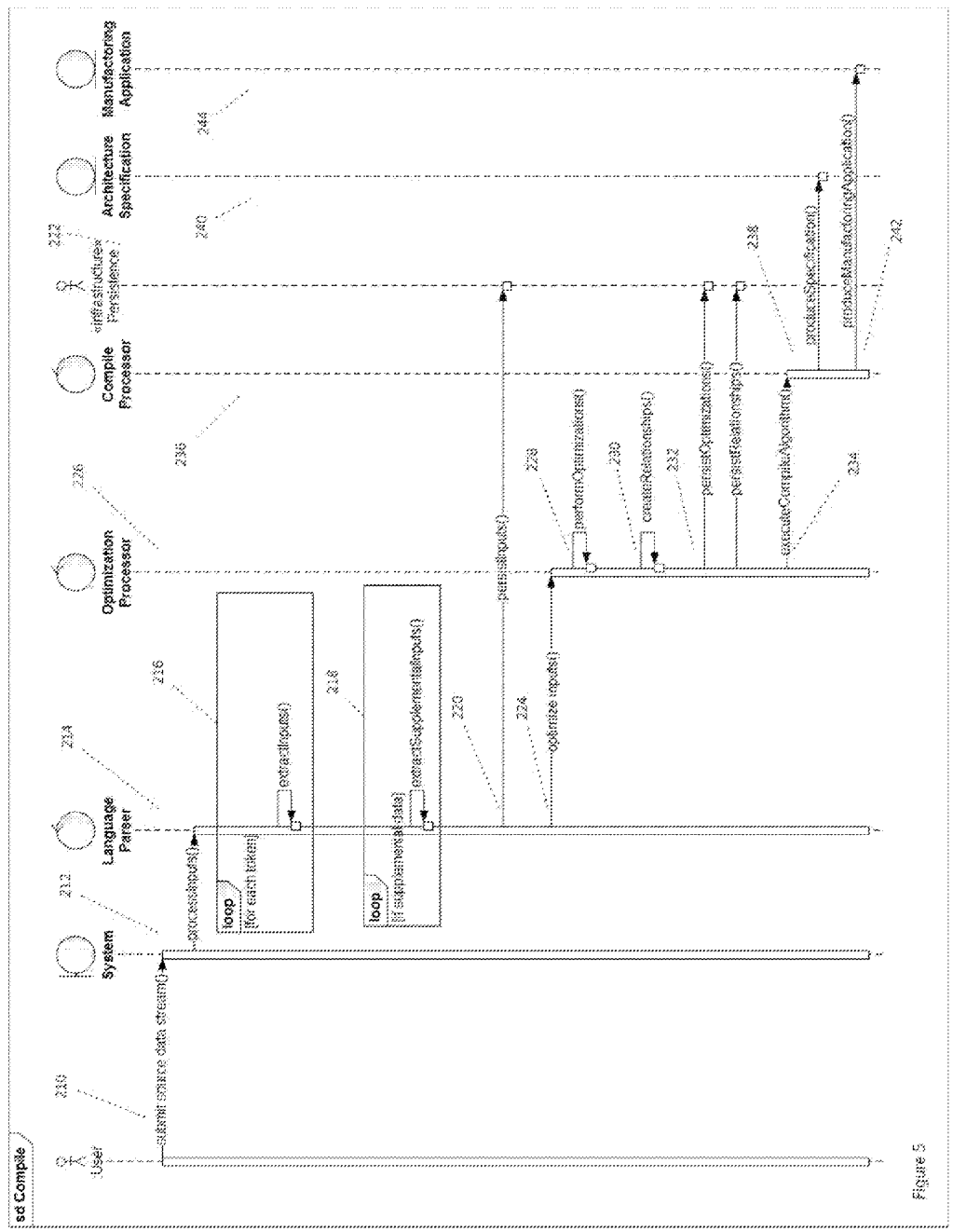
FIG. 5 is a UML sequence diagram being illustrative of an embodiment of a method of the invention.

FIG. 5 is illustrative of an embodiment where an actor interacts with the system via the System boundary 212. The Language Parser control 214 receives the inputs from the System boundary 212 and processes the inputs. The Language Parser control 214 loops thru the specification and extracts the inputs. If supplemental data is present in the source data stream the Language Parser control 214 loops thru the specification and extracts supplemental data and attributes. Once the inputs have been extracted the Language Parser control 214 persists the inputs to Persistence actor 222 via the persistInputs( ) message 220. The Language Parser control 214 then passes control to the Optimization Processor control 226 to performOptimizations( ) 228 of inputs and createRelationships( ) 230. The Optimization Processor control 226 then persistOptimizations( ) 232 and persistRelationships( ) to persist the data to the Persistence actor 222. Once the Optimization processor control 226 has persisted its data it passes control to the Compile processor control 236. The Compile Processor control 236 produces either a Architecture Specification entity 240 or a Manufacturing Application entity 244 depending on the embodiment.

Figure 6:
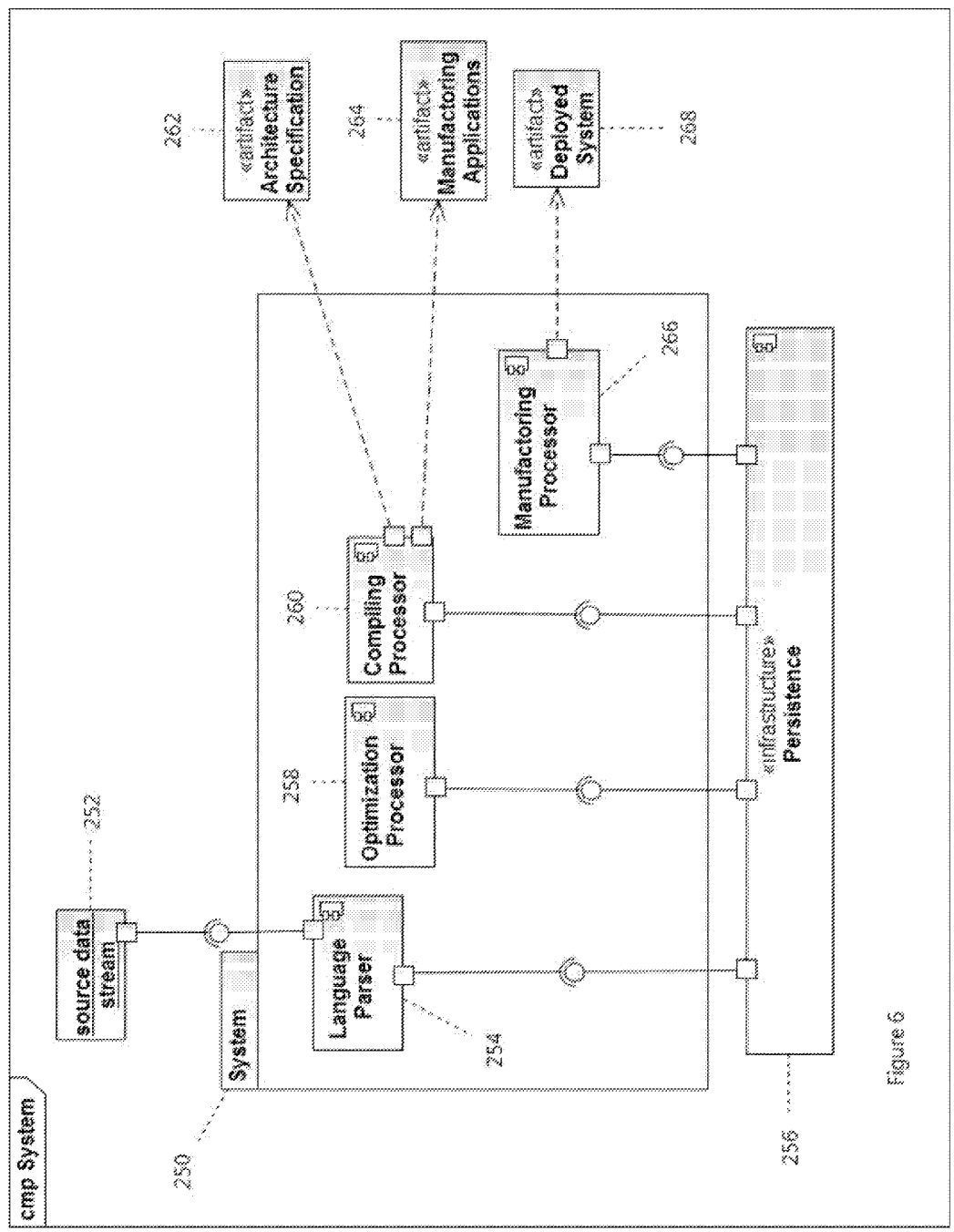
FIG. 6 is a UML component diagram being illustrative of an embodiment of a computer system of the invention APPENDIX 1 shows exemplary grammar for a specification file APPENDIX 2 shows exemplary grammar for a specification file APPENDIX 3 shows a shows exemplary implementation of the grammar in APPENDIX 1 but in xml as an alternative format.

FIG. 6 is illustrative of an embodiment where a source data stream object 252 is submitted to the computer System 250 via a computer network for processing. The Language Parser component 254 is invoked and uses the system processor to calculate and extract the inputs from the data stream. The Language Parser component 254 persists its data to the Persistence component 256 which may be a database or system memory data structure. The Optimization Processor component 258 is invoked to retrieve the inputs from the Persistence component 256 and uses the system processor to execute an optimization algorithm and create necessary relationships. The Optimization Processor component 258 persists its data to the Persistence component 256. The Compiling Processor component 260 is invoked to retrieve the optimized inputs and relationships from the Persistence component 256 and uses the system processor to execute a compilation algorithm to generate either an Architecture Specification artifact 262 or a Manufacturing Applications artifact depending on the embodiment. In a further embodiment of the system the Manufacturing Processor component 266 will be invoked to use the system processor to execute the Manufacturing Applications artifacts 264 to create the Deployed Systems artifact 268.

To facilitate the processing of specifications a new grammar and syntax may be required. The listing in APPENDIX 1 and APPENDIX are examplary grammar for a specification file that may be used as inputs to the methods described in FIG. 3 and FIG. 4. The listing in APPENDIX 3 shows a possible implementation of the grammar in APPENDIX 1 but in xml as an alternative format.

In summary, the present disclosure provides a method and system for creating a vendor independent computer language and compiling the computer language into an architecture specification language, including the steps of taking a source data stream (FILE, WSDL, XML) and passing thru a language parser, populating a storage medium with a plurality of technical inputs and vendor technical specifications for generic technologies and probable technologies required for desired architectures generated by the language parser, optimizing the inputs and creating relationships between technologies and groups of technologies and storing results in the storage medium.

The processing features and functions described herein provide for generating a computer architecture representation in a reusable syntax and grammar. The disclosed subject matter provides an enhanced means of creating artifacts such as high-level design documents, bills of materials and traditional drawings that may be implemented in various manners. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Thus, the claimed subject matter is not intended to be limited to the embodiments shown herein but is to be accorded the widest scope consistent with the principles and novel features disclosed herein.

APPENDIX 1

Example Specification Language Structure

```
%token STRING
specification:
                attribute_element requirement_element
        |       attribute_element requirement_element_list
requirement_element
        ;
attribute_element:
                element TYPE literal
        ;
requirement_element_list:
                requirement_element
        |       requirement_element_list requirement_element
        ;
requirment_element:
                element
        ;
element:
                VALUE literal
literal:
                STRING
```

APPENDIX 2

Example Architecture Specification Language Structure

```
%token STRING
architecturespecification:
            attribute_element deployment_element
    |       attribute_element_list deployment_element
    |       attribute_element deployment_element_list
deployment_element
    |       attribute_element_list deployment_element_list
            attribute element deployment element
    ;
attribute_element_list:
            attribute_element
    |       attribute_element_list attribute_element
    ;
attribute_element:
            element TYPE literal
    ;
deployment_element_list:
            deployment_element
    |       deployment_element_list deployment_element
    ;
deployment_element:
            DEPLOYMENT literal
    |       DEPLOYMENT literal TYPE literal
    ;
provider_element_list:
            provider_element
    |       provider_element_list provider_element
    ;
provider_element:
            PROVIDER literal
    |       PROVIDER literal TYPE literal
    ;
hypervisor_element_list:
            hypervisor_element
    |       hypervisor_element_list hypervisor_element
    ;
hypervisor_element:
            HYPERVISOR literal
    |       HYPERVISOR literal TYPE literal
    ;
os_element_list:
            os_element
    |       os_element_list os_element
    ;
os_element:
            OS literal
    |       OS literal TYPE literal
    ;
application_list:
            application_element
    |       application_element_list application_element
    ;
application_element:
            APPLICATION literal
    |       APPICATION literal TYPE literal
    ;
element:
            NAME literal
    |       NAME literal TYPE literal
literal:
            STRING
```

APPENDIX 3

Example XML specification

```
<TechnicalSpecification
xmlns:xsi="http://www.w3.org/2001/XMLSchema-instance"
xsi:noNamespaceSchemaLocation="TS.xsd">
    <RequirementGroup>
        <Value>Windows Server 2007</Value>
        <Attribute>
            <Type>Sequence</Type>
            <Value>1</Value>
        </Attribute>
```

APPENDIX 3-continued

Example XML specification

```
        <SubRequirementGroup>
            <Requirement>
                <Value>Memory</Value>
                <Attribute>
                    <Type>Sequence</Type>
                    <Value>1</Value>
                </Attribute>
                <Attribute>
                    <Type>Minumum</Type>
                    <Value>2048</Value>
                </Attribute>
                <Attribute>
                    <Type>Recommeded</Type>
                    <Value>4096</Value>
                </Attribute>
            </Requirement>
            <Requirement>
                <Value>Disk</Value>
                <Attribute>
                    <Type>Sequence</Type>
                    <Value>2</Value>
                </Attribute>
                <Attribute>
                    <Type>Minumum</Type>
                    <Value>8G</Value>
                </Attribute>
                <Attribute>
                    <Type>Recommeded</Type>
                    <Value>20G</Value>
                </Attribute>
            </Requirement>
        </SubRequirementGroup>
    </RequirementGroup>
</VendorTechnicalSpecification>
```

What is claimed is:

1. A non-transitory computer-accessible for creating a vendor independent computer language, comprising:
    a data structure instantiating code segment for establishing a storage record in memory having:
    a technical identifier, the technical identifier providing identification for the following:
        hardware grouping;
        software grouping; and
        combinations thereof;
    a plurality of technical input records,
        each of said plurality of technical input records maintaining a pointer in memory to said technical identifier; and
    a lexical and syntactical analysis algorithm, said lexical and syntactical analysis algorithm for determining said plurality of technical input records match a valid structure and grammatical syntax.

2. The non-transitory computer-accessible medium of claim 1, further comprising computer instructions for:
    passing a source data stream through a language parser; and
    populating a storage medium with at least a portion of the plurality of technical input records an plurality of vendor technical specifications;
    said plurality input records and a plurality of vendor technical specifications
    for an architecture generated by said lexical and syntactical analysis algorithm.

3. The non-transitory computer-accessible medium of claim 2, further comprising computer in ions for:
    optimizing at least a portion of said plurality of technical input records and said plurality of vendor technical specifications;

creating relationships between said at least a portion of the plurality of technical input records and said plurality of vendor technical specifications; and storing an optimized result in said computer-accessible medium.

4. The non-transitory computer-accessible medium of claim 2, further comprising computer instructions for:

further populating said storage medium with a business input for a customer.

5. The non-transitory computer-accessible medium of claim 2, further comprising computer instructions for:

further populating said storage medium with supplemental attributes.

6. The non-transitory computer-accessible medium of claim 5, further comprising said lexical and syntactical analysis algorithm communicating with said storage medium and coupled to a compute network;

said lexical and syntactical analysis algorithm for parsing said plurality of vendor technical specifications and said plurality of technical input records into individual inputs and value pairs; and recording said individual inputs a value pairs to the storage medium.

7. The non-transitory computer-accessible medium of claim 2, further comprising computer instructions for:

a compiling processor communicating with said storage medium and coupled to a computer network;

said compiling processor for retrieving at least one input from the storage medium and providing a plurality of technology choices based on said at least one input to an architecture delivery server; and said compiling processor for generating an architecture in an architecture specification language based on the said at least one input.

8. The non-transitory computer-accessible medium of claim 7, further comprising computer instructions for:

an optimization processor communicating with said storage medium and coupled to a computer network;

said optimization processor for optimizing said architecture to provide an optimized architecture; and said optimization processor for recording said optimized architecture to the storage medium.

9. The non-transitory computer-accessible medium of claim 8, further comprising computer instructions for:

said lexical and said lexical and syntactical analysis algorithm communicating with said storage medium and coupled to a computer network;

said lexical and syntactical analysis algorithm for parsing ness inputs and business goals into individual inputs and value pairs; and said lexical and syntactical analysis algorithm for recording said individual inputs and said value pairs to the storage medium.

10. A non-transitory computer-accessible medium for creating an architecture specification language, comprising:

a data structure instantiating code segment that establishes a storage record in memory, said data structure instantiating code segment comprising:

an architecture specification identifier;

a plurality of technical input records and business input records, each of said plurality of technical input records and business input records maintaining a respective pointer in memory to said architecture specification identifier;

a lexical and syntactical analysis algorithm, said lexical and syntactical analysis algorithm configured for determining said plurality of technical input records and business input records matching a valid structure and grammatical syntax; and a compiling algorithm, said compiling algorithm configured for:

identifying at least one technology and input required to create the architecture; and compiling said architecture specification language representation of architecture.

11. The non-transitory computer-accessible medium of claim 10, further comprising computer instructions for:

passing a source data stream through a language parser; and populating a storage medium with the plurality of technical input records and the plurality of vendor technical specifications for architectures generated by the language parser.

12. The non-transitory computer-accessible medium of claim 11, further comprising computer instructions for:

optimizing at least a portion of said plurality of technical input records and said plurality of vendor technical specifications;

creating relationships between said at least a portion of the plurality of technical input records and said plurality of vendor technical specifications; and storing an optimized result in said computer-accessible medium.

13. The non-transitory computer-accessible medium of claim 11, further comprising computer instructions for:

further populating said computer-accessible medium with at least one business input and business goal definition for a customer.

14. The non-transitory computer-accessible medium of claim 11, further comprising computer instructions for:

further populating said computer-accessible medium with supplemental attributes.

15. The non-transitory computer-accessible medium of claim 14, further comprising computer instructions for:

a language parser communicating with said storage media and coupled to a computer network;

said language parser for parsing vendor technical specifications and technical inputs into individual inputs and value pairs; and recording said individual inputs and said value pairs to the computer-accessible medium.

16. The non-transit computer-accessible medium of claim 11, further comprising computer instructions for:

employing a compiling algorithm to retrieve at least one input from the computer-accessible medium, suggest technology choices based on a received business input and business goal, and produce an architecture in an architecture specification language.

17. The non-transitory computer-accessible medium of claim 16, further comprising computer instructions for:

an optimization processor communicating with said computer-accessible medium and coupled to a computer network;

said optimization processor for optimizing at least parsed inputs and creating relationships; and recording those inputs to the computer-accessible medium.

18. The non-transitory computer-accessible medium of claim 17, further comprising computer instructions for:

a compiling processor communicating with said computer-accessible medium and coupled to a computer network;

said compiling processor for retrieving inputs from the computer-accessible medium and providing technology choices based on inputs to an architecture delivery server and generating an architecture in an architecture specification language based on the inputs.

19. The non-transitory computer-accessible medium of claim 18, further comprising computer instructions for:
a language parser communicating with said storage medium and coupled to a computer network;
said language parser for parsing business inputs and business goals into individual inputs and value pairs; and
recording said individual inputs and said value pairs to the computer-accessible medium.

* * * * *